United States Patent
Pajot

(10) Patent No.: US 6,619,907 B1
(45) Date of Patent: Sep. 16, 2003

(54) METHOD AND APPARATUS FOR UNLOADING AND RELOADING RETURNABLE SHIPPING CONTAINERS FROM A TRAILER

(75) Inventor: James H. Pajot, Coleman, MI (US)

(73) Assignee: General Motors Corporation, Detroit, MI (US)

( * ) Notice: Subject to any disclaimer, the term of this patent is extended or adjusted under 35 U.S.C. 154(b) by 64 days.

(21) Appl. No.: 09/718,449

(22) Filed: Nov. 21, 2000

(51) Int. Cl.[7] .............................................. B65G 60/00
(52) U.S. Cl. .................. 414/795.2; 414/528; 414/797.5
(58) Field of Search ...................... 198/339.1; 414/528, 414/540, 545, 795.2, 797.5

(56) References Cited

U.S. PATENT DOCUMENTS

| | | | |
|---|---|---|---|
| 2,916,169 A | * 12/1959 | De Witt | 414/528 |
| 3,578,184 A | * 5/1971 | Schaich | |
| 3,905,494 A | * 9/1975 | Yatagai et al. | 414/528 |
| 4,261,682 A | * 4/1981 | Papps et al. | 414/528 |
| 5,645,390 A | * 7/1997 | Filiberti et al. | 414/528 X |
| 5,803,701 A | * 9/1998 | Filiberti et al. | 414/390 X |
| 5,921,740 A | * 7/1999 | Stewart | 414/399 |

FOREIGN PATENT DOCUMENTS

JP     3-249022    * 11/1991 .................. 414/528

* cited by examiner

*Primary Examiner*—Janice L. Krizek
(74) *Attorney, Agent, or Firm*—Laura C. Hargitt

(57) ABSTRACT

A method and apparatus is provided for automated removal of shipping containers from a trailer and the automatic return of the emptied shipping containers to a trailer after the cargo has been removed from the container.

3 Claims, 10 Drawing Sheets

METHOD AND APPARATUS FOR UNLOADING AND RELOADING RETURNABLE SHIPPING CONTAINERS FROM A TRAILER

This invention relates to the handling of returnable shipping containers delivered to a manufacturing factory by a trailer, and more particularly relates to a method and apparatus for automated removal of shipping containers from a trailer and then automatically returning the empty shipping containers to a trailer after the cargo has been removed from the container.

BACKGROUND OF THE INVENTION

It is well known in modern manufacturing plants, particularly in the automotive industry, to ship a cargo of manufactured articles between a manufacturing factory and an assembly factory via returnable containers. These returnable containers are typically large steel rectangular boxes or racks which are configured to carry vehicle components and modules such as, for example, and engine and transmission assembly, a set of seats for a vehicle, or an instrument panel module.

It is known to ship the containers within a trailer having a motorized conveyor on the load floor of the trailer for advancing the row of containers rearwardly out of the doorway onto a factory floor. It is also known to provide a motorized conveyor on the factory floor so that the shipping containers are ejected rearwardly out of the trailer and onto the motorized storage conveyor in readiness for a fork trailer to pick up the container and carry the container to an assembly line. A motorized storage container conveyor of this type is advantageous because the cargo can be quickly unloaded from the trailer and placed in storage.

It is desirable to increase the efficiency and economy of vehicle assembly by minimizing the inventory in storage via just-in-time delivery to the assembly factory and to ship and receive manufactured goods in the exact sequence in which the goods are needed. It is also desirable to minimize the floor space needed for storage and to eliminate the double handling of containers.

The present invention relates to an apparatus and method by which the unloading of containers from a trailer is further automated to obtain additional efficiencies in the shipment of manufactured goods between the manufacturing plant and the assembly plant.

DESCRIPTION OF THE PREFERRED EMBODIMENTS

Figure 1:
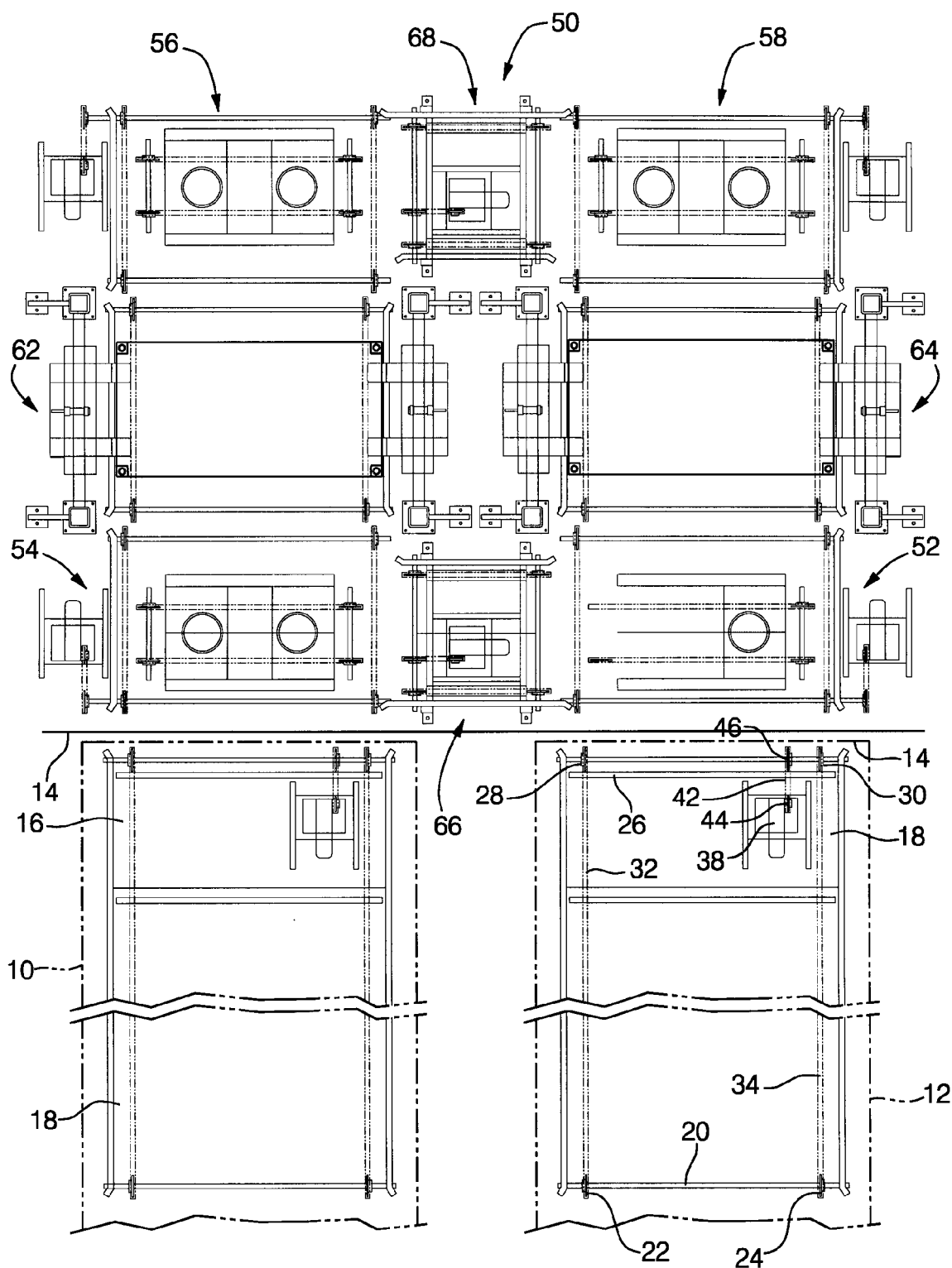
FIG. 1 is a plan view showing a trailer part full of full containers and a trailer part full of empty containers parked at a trailer dock adjacent a container handling apparatus located on the factory floor.

Referring to FIG. 1, a pair of trailers 10 and 12 are parked side by side in a trailer well located inside a factory building. The trailers are backed against a loading dock 14. Trailer 10 has a load floor 16 and trailer 12 has a load floor 18. Each of the trailers has a doorway at the rear which opens unto the factory floor to enable loading and unloading of returnable shipping containers from the trailers.

As seen in FIG. 1, a motorized conveyor is mounted on the floor of each of the trailers. The motorized conveyor includes a shaft 20 at the front of the trailer which carries sprockets 22 and 24. A shaft 26 is mounted at the rear of the trailer and carries sprockets 28 and 30. A conveyor chain 32 encircles the sprockets 22 and 28 at the left hand side of the trailer. A conveyor chain 34 encircles the sprockets 24 and 30 at the right hand side of the trailer. A drive motor 38 is mounted underneath the floor of the trailer and connected to the shaft 26 by a drivechain 42 and sprockets 44 and 46. Energizing the drive motor 38 will rotate the shaft 26 so that the chains 32 and 34 move along the floor of the trailer and the shipping containers resting on the chains will be carried rearwardly out the doorway of the trailer or will be advanced forwardly into the trailer depending on the direction of motion of the conveyor chains 32 and 34.

Figure 2:
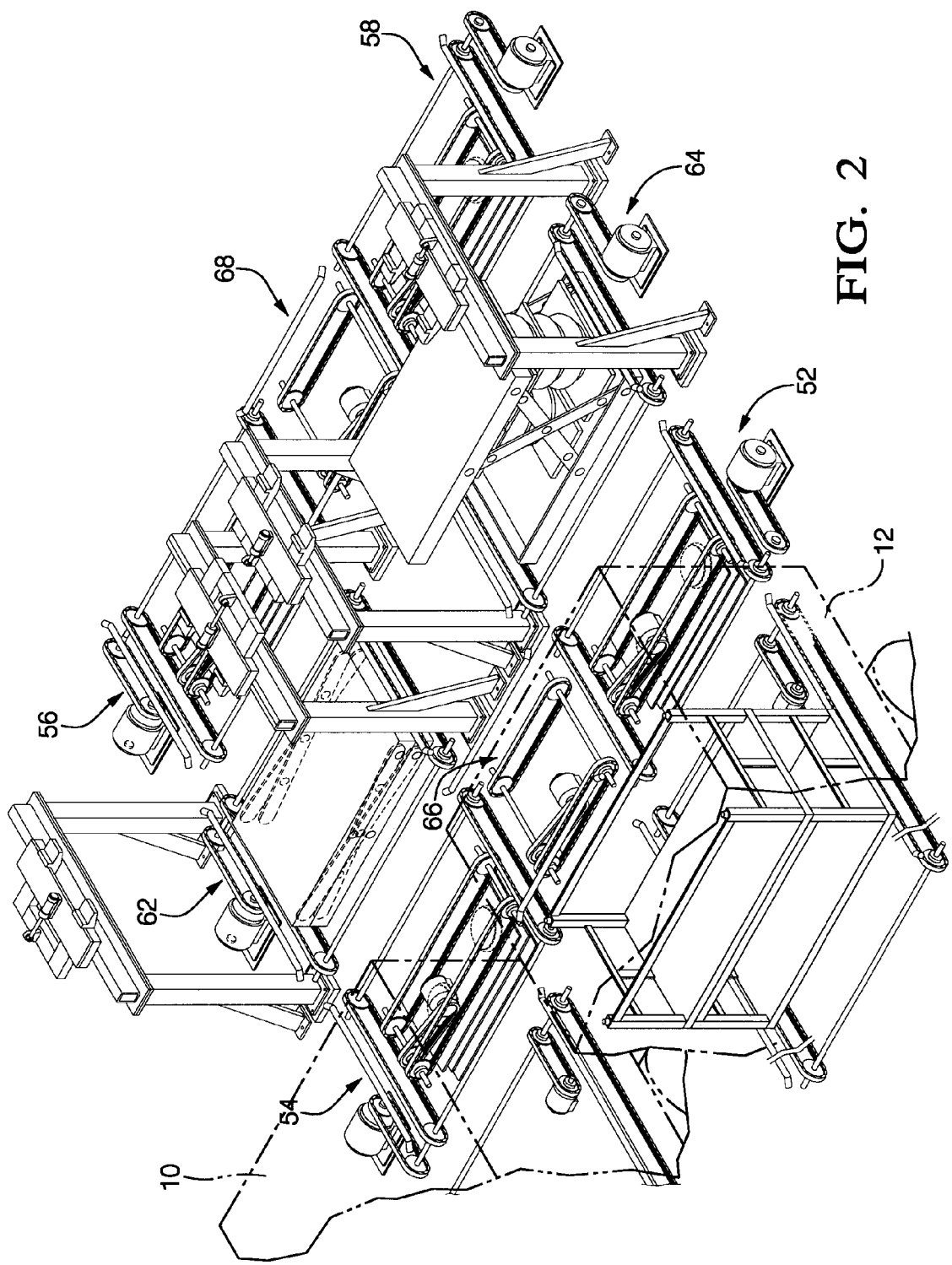
FIG. 2 is a perspective view corresponding to FIG. 1.

FIG. 1 also shows a factory floor container handling apparatus, generally indicated at 50, for receiving loaded containers from the trailers and then returning the emptied containers to the trailers after the cargo has been unloaded from the container. As best seen in FIGS. 1 and 2, the factory floor apparatus 50 is comprised of individually powered conveyor devices including four corner units generally indicated at 52, 54, 56 and 58, two stacker units generally indicated at 62 and 64, and two straight-away units generally indicated at 66 and 68. If desired an additional straight-away unit may be installed between the trailer 12 and corner unit 52, and between trailer 10 and corner unit 54.

The Stacker Unit

Figure 3:
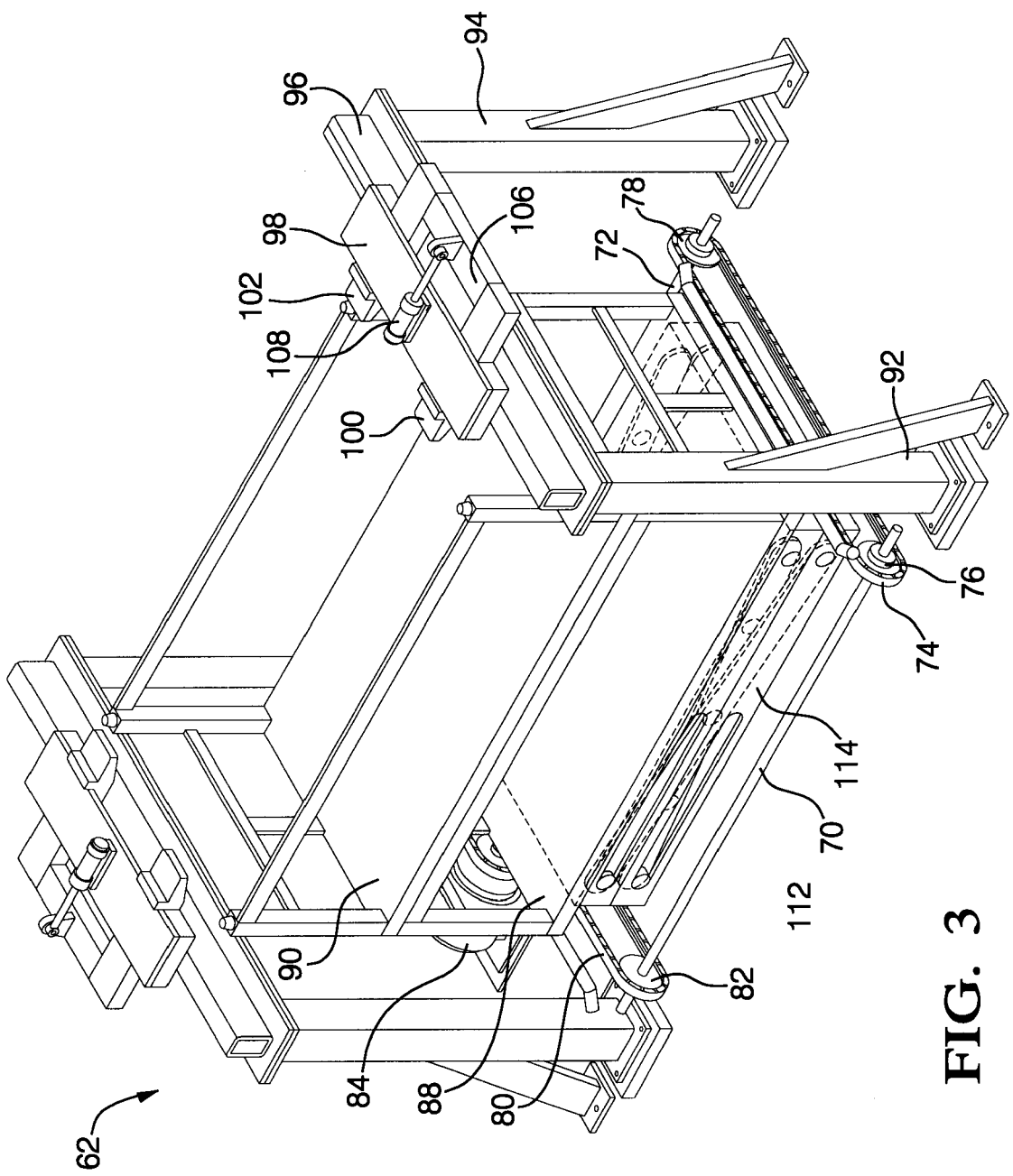
FIG. 3, FIG. 4 and FIG. 5 are perspective views showing the operation of the stacker unit for stacking and unstacking containers.
Figure 4:
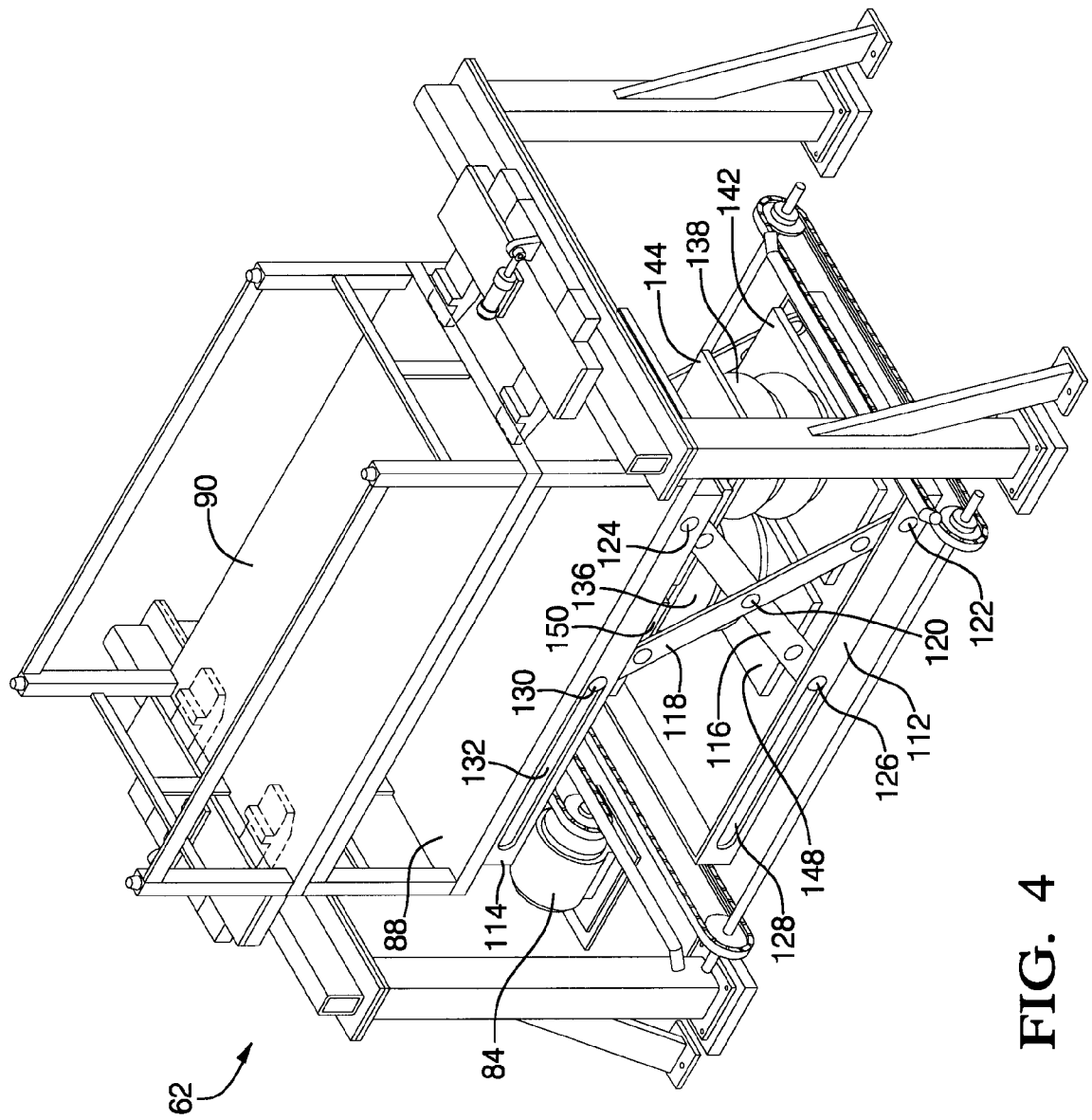
Figure 5:
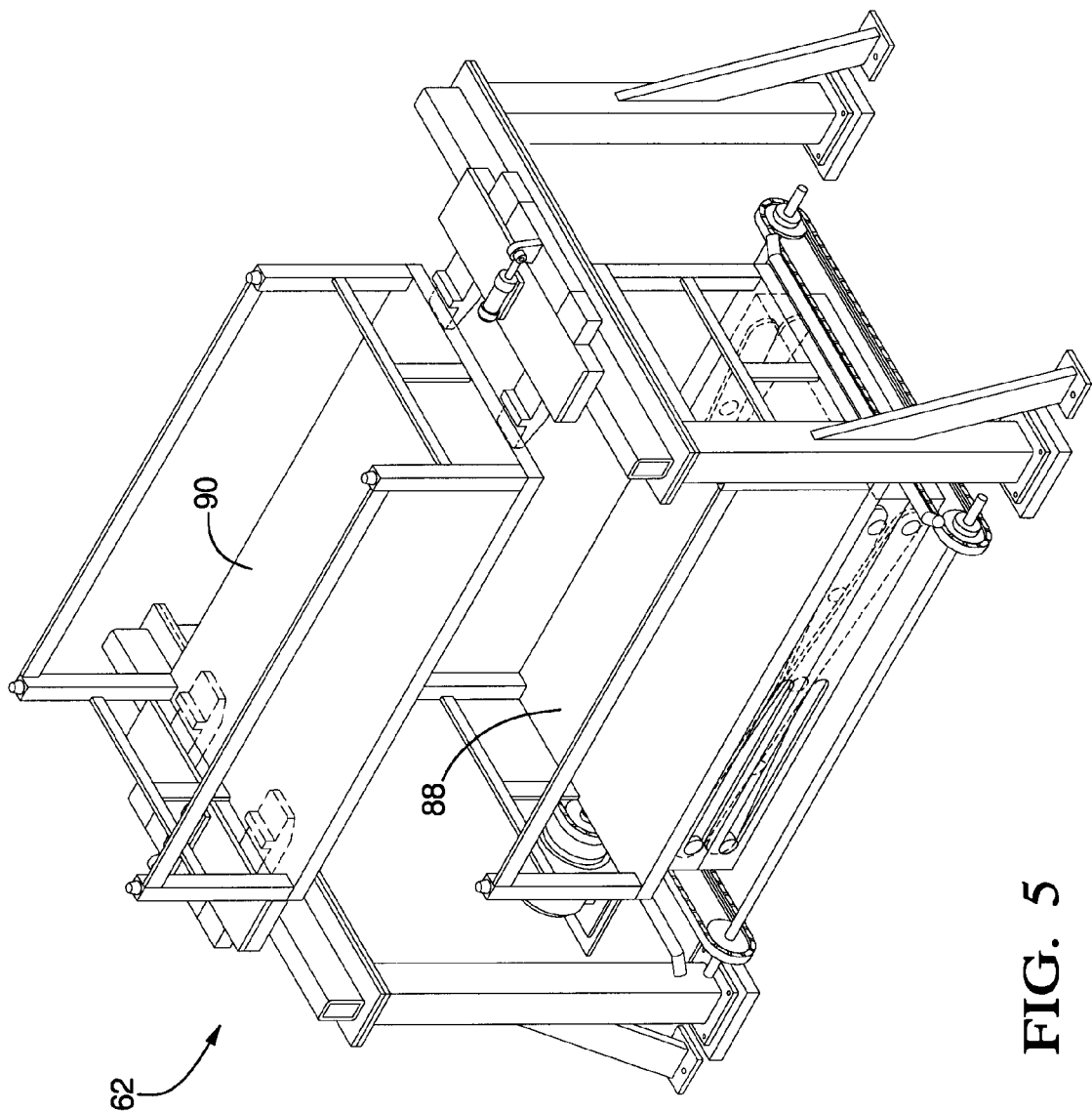

Referring to FIGS. 3, 4 and 5, the stacker unit 62 is shown and includes spaced apart shafts 70 and 72. A conveyor chain 74 encircles a chain sprocket 76 mounted on shaft 70 and a chain sprocket 78 mounted on shaft 72. A conveyor chain 80 encircles a chain sprocket 82 mounted on shaft 70 and a chain sprocket, not shown, mounted on shaft 72.

A drive 84 is connected to shaft 72 by chains and sprockets. A shipping container 88 rests upon conveyor chains 74 and 80. A second shipping container 90 is stacked on top of container 88.

The stacker unit 62 also includes a pair of vertical supports 92 and 94 connected by a cross member 96. A guide plate assembly 98 slideably supports a pair of forks 100 and 102 that are connected by a plate 106. An air cylinder 108 acts between plate 106 and the guide plate assembly 98 so that actuation of the air cylinder 108 will move the forks 100 and 102 between retracted positions of FIG. 3 and extended positions of FIGS. 4 and 5. As best seen in the drawings, similar supporting legs and fork mechanisms are also provided on the opposite side of the stacker unit 62.

The stacker unit 62 also includes an stacker mechanism for raising and lowering the shipping containers. As best seen in FIG. 4 the lift mechanism includes a base plate 112 and a lift plate 114 that are connected by scissors mechanism including scissors arm 116 and scissors arm 118 that are connected at their centers by a pivot 120. The lower end of arm 118 is pivotally connected to the base plate by pivot 122. The upper end of arm 116 is pivotally connected to the lift plate 114 by pivot 124. The lower end of arm 116 carries a roller 126 that rolls within a channel 128 attached to base plate 112. The upper end of arm 118 carries a roller 130 that rolls within a channel 132 attached to lift plate 114.

The lift plate 114 is raised and lowered by a pair of inflatable actuators 136 and 138. Actuator 138 is captured between a support plate 142 pivoted on arm 118 and a support plate 144 pivotally mounted on the top of arm 116. Actuator 136 is similarly mounted between a support plate 148 pivoted at the lower end of arm 116 and a support plate 150 pivotally mounted at the top end of arm 118.

In FIG. 3, the actuators are at their normal uninflated condition in which the lift plate 114 is lowered so that the container 88 sits on the conveyor chains 74 and 80 to enable the conveyor chains to move the racks 88 and 90 in and out of the stacker unit 62. In FIG. 4, the actuators 136 and 138 have been inflated to thereby lift the lift plate 114 and the shipping containers 88 and 90. FIG. 4 also shows that the air cylinder 108 has been actuated to extend the forks 100 and 102 beneath the rack 90. In FIG. 5, the actuators 136 and 138 have been deflated to lower the lift plate 114 and the rack 88 while the fork holds the container 90. Accordingly, the conveyor chains 74 and 80 can be energized to move a rack 88 out of the stacker unit 62. Subsequently, the actuators 136 and 138 can be reinflated to raise the lift plate 114 and thereby raise the container 90 off the forks 100 and 102 so that the forks can be retracted by the air cylinder 108 and then the actuators are deflated to lower the rack 90 onto the conveyor chains 74 and 80.

The Corner Unit

Figure 6:
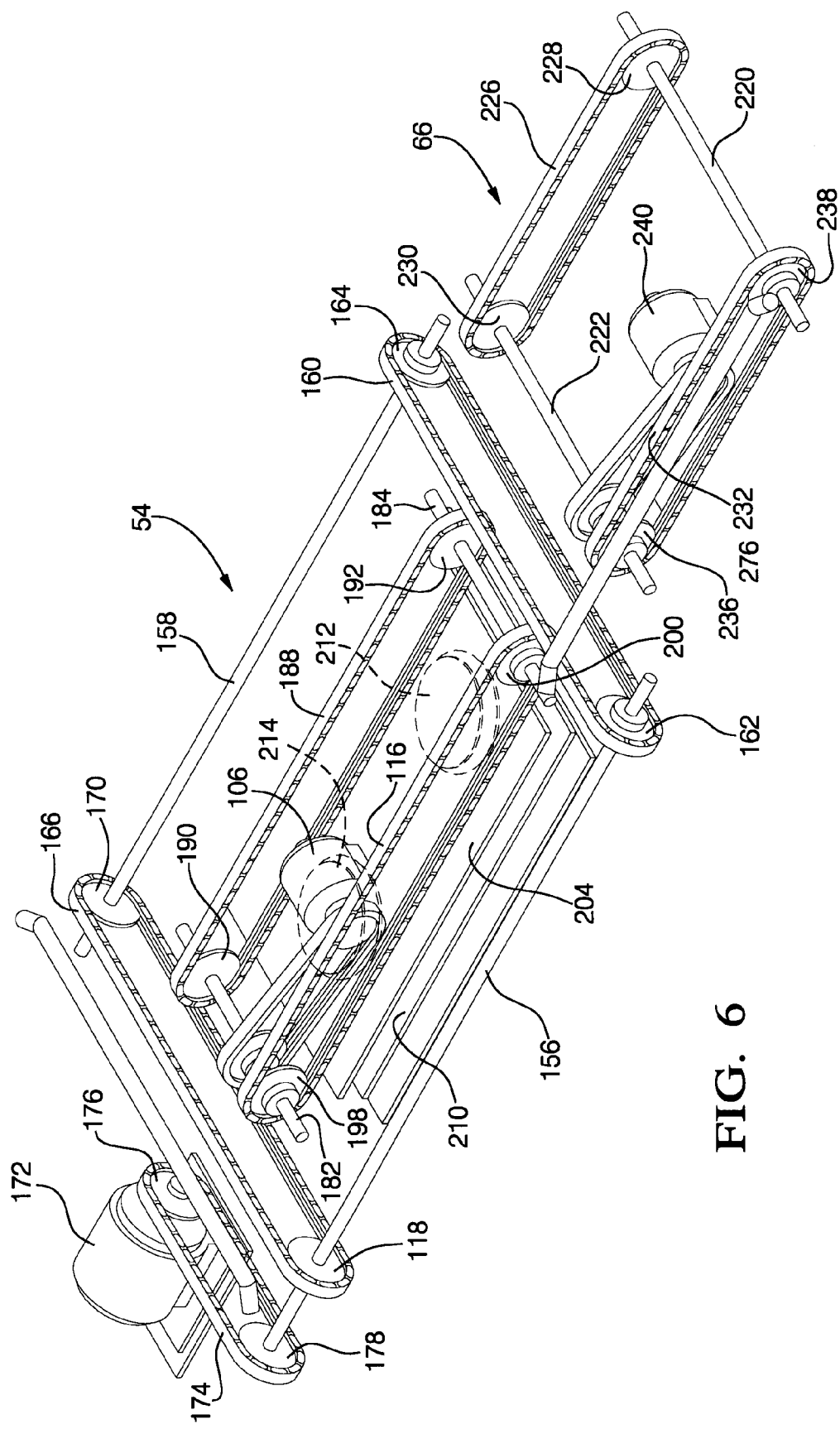
FIG. 6 is a perspective view showing a corner unit for moving containers around a corner and a straight-away unit for moving containers in a straight line.

As referring to FIG. 6, the corner unit 54 is a typical corner unit and includes spaced apart primary shafts 156 and 158. A conveyor chain 160 encircles a chain sprocket 162 mounted on shaft 156 and a chain sprocket 164 mounted on shaft 158. A conveyor chain 166 encircles chain sprockets 168 on shaft 156 and a chain sprocket 170 on shaft 158. A drive motor 172 is connected to the primary shaft 156 by a drive chain 174 and a pair of chain sprockets 176 and 178.

The corner unit 54 also includes spaced apart secondary shafts 182 and 184. A conveyor chain 188 encircles a drive sprocket 190 mounted on secondary shaft 182 and a chain sprocket 192 mounted on secondary shaft 184. A conveyor chain 196 encircles a chain sprocket 198 provided on secondary shaft 182 and a chain sprocket 200 mounted on secondary shaft 184. The secondary shafts 182 and 184 are mounted on a lift plate 204 and are connected to a secondary drive motor 206 by a drive chain and a pair of sprockets. The lift plate 204 is mounted on a base plate 210 by a scissors mechanism similar to that shown in FIGS. 3–5 and actuated by a pair of airbags 212 and 214 to lift the secondary chains 188 and 196 just a few inches to an elevation just slightly higher than the primarily conveyor chains 160 and 166. The lift plate 204 normally establishes the secondary conveyor chains 188 and 196 at an elevation lower than the primary conveyor chains 160 and 166. It will be understood and appreciated that a shipping container resting on the corner unit 54 will be supported and moved by the secondary chains 188 and 196 when the lift plate 204 is elevated by the actuators 212 and 214, and the container will be supported and moved by the primary chains 160 and 166 when the lift plate 204 is lowered.

Straight-Away Unit

Referring to FIG. 6, the straight-away unit 66 is a typical straight-away unit and includes spaced apart shafts 220 and 222. Conveyor chain 226 encircles chain sprocket 228 mounted on shaft 220 and chain sprocket 230 mounted on shaft 222. Conveyor chain 232 encircles chain sprocket 236 mounted on shaft 220 and chain sprocket 238 mounted on shaft 222. Drive unit 240 is connected to shaft 222 by a drive chain and sprockets.

Operation of the Apparatus

Figure 7:
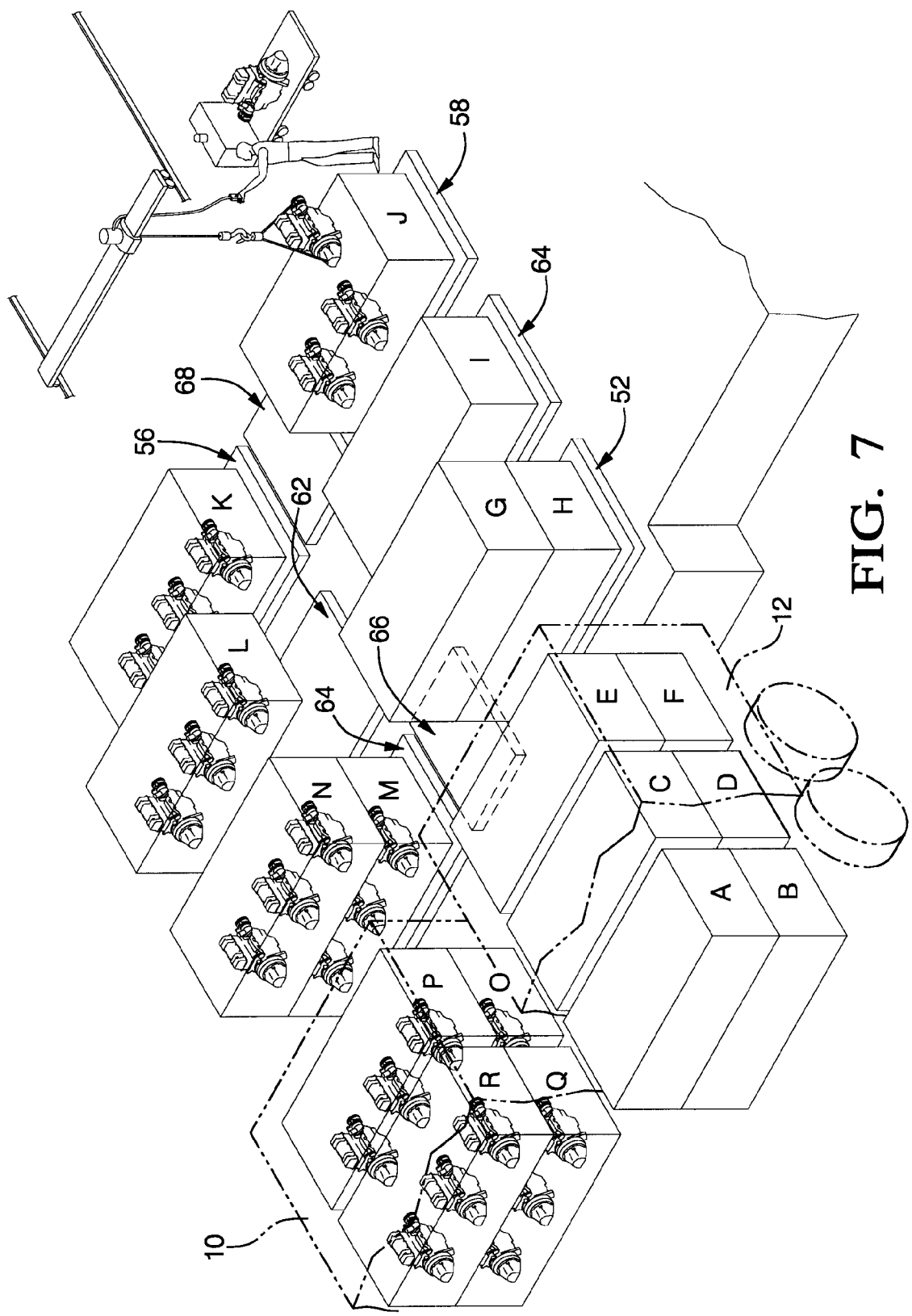
FIG. 7 is a perspective schematic view showing the movement of containers from the loaded trailer, unstacking of the containers, unloading of the containers, and restacking of the emptied containers, and return of the empty containers into the trailer.

As best shown in FIG. 7 the loaded trailer 10 carries containers of engines which are bar-coded to be delivered to the vehicle assembly line in sequence with the vehicle then being assembled. Thus, it is necessary to empty the engines from container 0, then proceed to unload containers P, Q and R. In order to unload the trailer, as seen in FIG. 7, the containers are unloaded by circulating the containers in the clock-wise direction. In particular, the containers O and P will be ejected from the trailer 10 by the actuating the chain conveyor in the floor of the trailer. The containers O and P will be moved into an entry station provided by the corner unit 54 and travel into the stacker unit 62. The stacker unit 62 will lift the upper container P off the lower container O so that the lower container O can then be moved onto the corner unit 56. Then the unit O will be moved from the corner unit 56 across the straight-away unit 68 to the corner unit 58, where a factory worker will unload an engine from the container and transfer the engine onto an automated guided vehicle blank for delivery to the assembly line. After all the engines are unloaded at the corner unit 58, the container will progress to the stacker unit 64 where container O will be lifted and await the entry of empty container P. Then container O is lowered on top of container P and the restacked containers are moved from the stacker unit 64 to the corner unit 52 and then moved into the empty receiving trailer 12.

Thus, it will be appreciated that the stacked containers move out of the trailer to an entry station at 54, are unstacked at the unstacking station at stacker 62, and moved to the unloading station at corner unit 58 where the worker unloads the engines. Then the racks are restacked at the unstacking station provided by stacker unit 64, and automatically moved into the empty trailer 12 at the exit station provided by corner unit 52 and by the conveyor mounted on the floor of the vehicle 12.

The various conveyor units cooperate to provide a continuous loop or carousel through which the containers progress and circulate in sequence. It will be appreciated that the various conveyor units are operated by a central programmable controller which interconnects the separate drive motors of the conveyor units with a plurality of switches and sensors to automatically cycle the containers through the unloading and reloading process. The floor mounted conveyor units in the trailers are electrically plugged into the central controller so that the trailer mounted conveyors are coordinated with the operation of the handling apparatus located on the factory floor.

It will be appreciated that when the trailer 12 has received a full load of empty containers, the trailer of empties will be taken away and replaced with a full trailer. Meanwhile, the trailer 10 of full containers has been completely emptied of containers and is ready to begin receiving empty containers. In order to maintain the clockwise flow of containers, it will be understood that the full containers exiting from trailer 12 will pass onto the corner unit 52 and then across the straight-away unit 66 to the corner unit 54, and then to the stacker unit 62. The next available full containers residing in trailer 12 will not be immediately exited the trailer onto the corner unit 52, but will however wait for the next stack of empty containers to traverse from the stacker unit 64 onto the corner unit 52 across the straight-away unit 66 and onto the corner unit 54, to then be transferred into the empty trailer 10.

SECOND EMBODIMENT OF THE INVENTION

Figure 8:
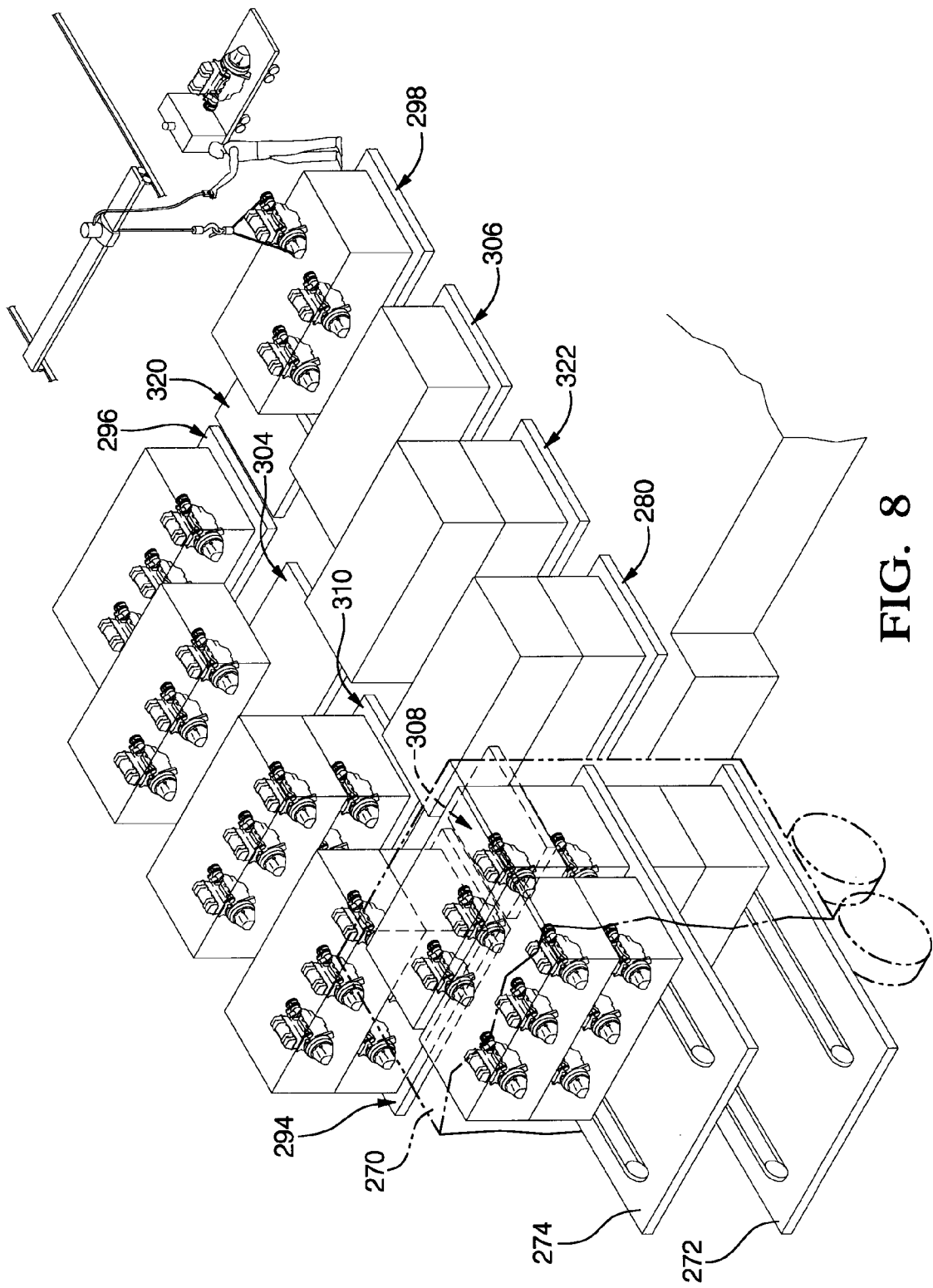
FIG. 8 is a perspective schematic view showing a second embodiment of the invention in which a single trailer has a lower load floor and an upper load floor.

Referring to FIG. 8 a second embodiment of the invention is shown in which a single trailer 270 is employed in conjunction with the factory floor apparatus. In particular, the trailer 270 includes a lower load floor 272 and an upper load floor 274. Each of the load floors has a motorized conveyor comprised of conveyor chains, sprockets, and drive units similar to those of the first embodiment. As seen in FIG. 8 the lower load floor 270 carries a load of double stacked containers and the upper load floor 274 also carries a load of double stacked containers.

Elevator Unit

Figure 9:
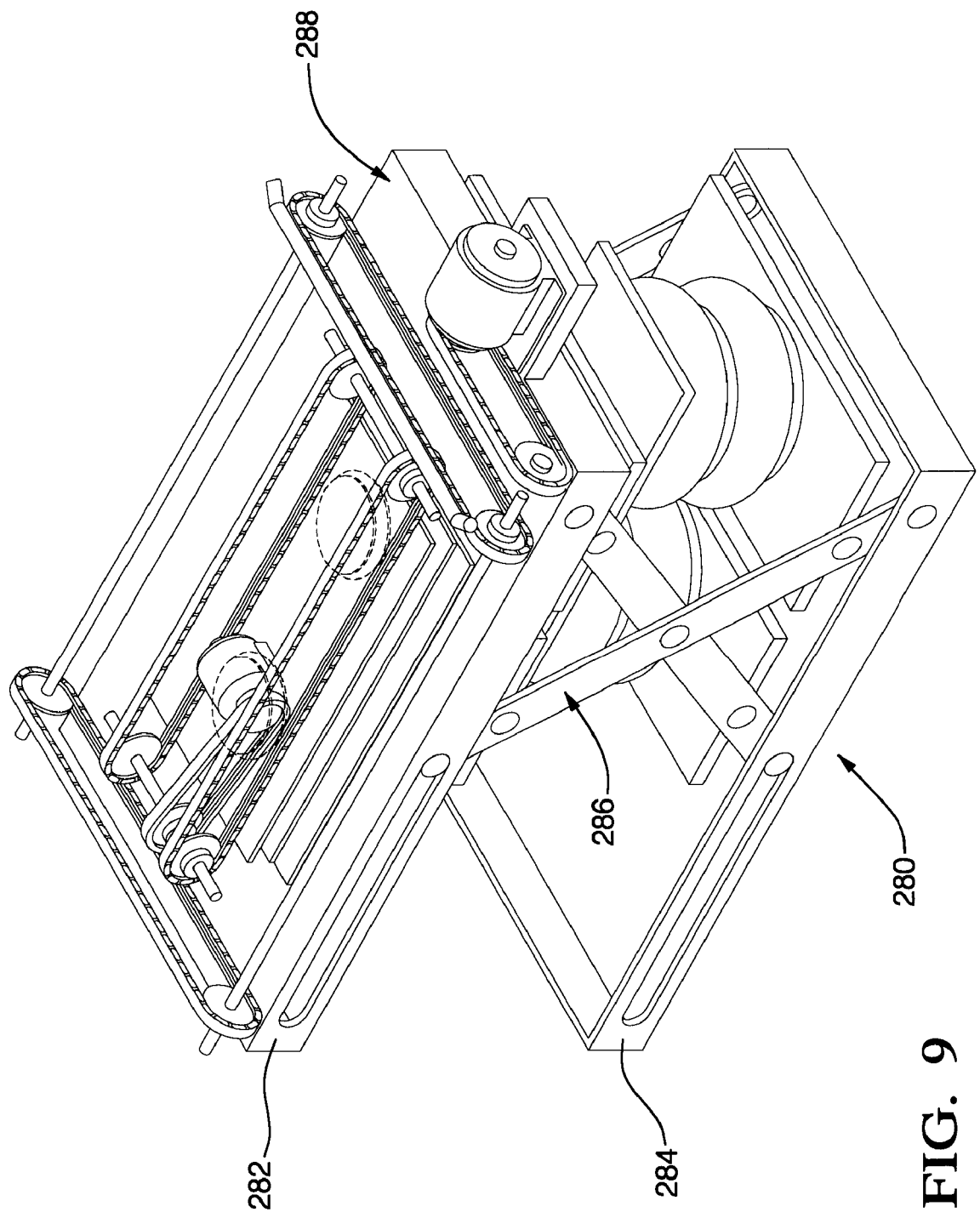
FIG. 9 is a perspective view showing an elevator unit.

As seen in FIG. 9, the factory floor apparatus includes an elevator unit 280. The elevator unit 280 generally includes a lift plate 282 and base plate 284 connected by a scissors mechanism, generally indicated by 286. Scissors mechanism is identical with the scissors mechanism described hereinbefore in reference to the stacker unit of FIGS. 3, 4 and 5 and is raised and lowered by similar air actuated bags. Mounted on top of base plate 284 is a corner unit generally indicated at 288 that is identical with the corner unit described hereinbefore in reference to FIG. 6. The elevator unit 280 of FIG. 8 may be moved between a lower position adapted to load and unload stacked containers from the lower load floors 272 of the trailer 270. Or the elevator mechanism can be raised to load and unload stacked containers from the upper load floor 274.

The factory floor apparatus of FIG. 9 also includes three corner units 294, 296 and 298 similar to the corner unit 54 of FIG. 6, stacker units 304 and 306, and straight-away units 308, 310, 320 and 322.

Operation

Referring to FIG. 8 it will be understood that when using only a single trailer, it is necessary to first unload all of the loaded shipping containers from either the upper load floor 274 or the lower load floor 272 so that an empty load floor is created to then begin receiving the empty containers therein. Assuming then that the upper load floor is the first to be unloaded, the elevator unit 280 will be elevated and a stack of containers will be exited from the upper load floor 274 onto the elevator unit 280. Then the load elevator unit 280 is lowered and the stacked containers are shunted across straight-away 308, corner unit 294, and straight-away unit 310. At stacker station 304 the stacked units are unstacked and then transferred to corner unit 296, straight-away 320, and then to the unloading station at corner unit 298.

After unloading, the containers are then restacked at stacker unit 306. The elevator unit 280 can then be used to reload the already emptied and restacked containers back into the emptied upper load floor 274. Meanwhile the lower load floor 272 can be unloaded.

It will be understood that implementation of the trailer unloading process with only a single trailer, as shown in FIG. 8, requires the use of upper and lower load floors, and also requires that the plant floor apparatus have sufficient capacity to hold and store enough containers so that upon arrival of a fully loaded trailer, either the upper load floor or the lower load floor can be completely emptied onto the plant floor apparatus to thereby enable reloading of emptied containers into the single trailer. It will be understood and appreciated that additional straight-away units can be added in order to provide the requisite capacity depending on the number of containers that are carried in the trailer.

Figure 10:
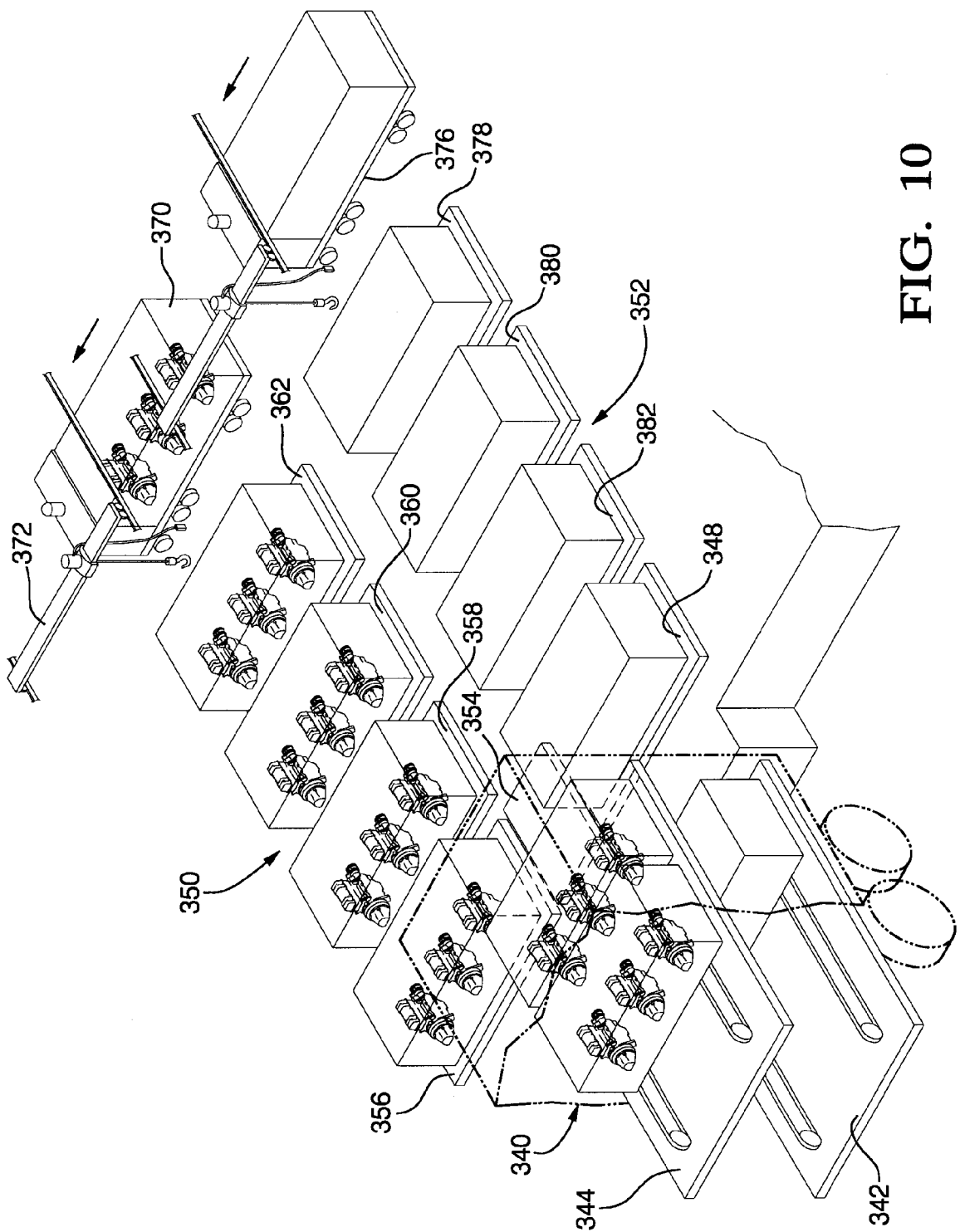
FIG. 10 is a perspective schematic view showing a third embodiment of the invention.

It will also be understood, that although the first embodiment of FIGS. 1 through 8 and the second embodiment of FIGS. 9 and 10 show the double stacking of the shipping containers, is also maybe desirable to have only a single unstacked container, for example, if the cargo being shipped is of substantial height or weight such that the containers cannot be readily double stacked. It is understood of course that the stacker units are not required when the containers are unstacked. Accordingly when containers are unstacked, the stacker units can be replaced with straight-away units, or stacker units can be left in place but function as straight-away units because stacking and unstacking is not required.

THIRD EMBODIMENT OF THE INVENTION

Referring to FIG. 10, a third embodiment of the invention is shown in which a trailer 340 includes a lower load floor 342 and an upper load floor 344, each of the load floors has a motorized conveyor and containers are shown in a single unstacked layer on each of the load floors.

An elevator unit 348 is the same as the elevator 280 of FIG. 9 and can be employed to load and unload containers from either of the lower load floor 342 or the upper load floor 344. In FIG. 10 the plant floor apparatus includes a first branch conveyor indicated at 350 for handling the loaded containers and a second conveyor branch 352 for handling the empty containers. In particular, loaded containers are carried from the elevator unit 348 to straight-away unit 354 to corner unit 356 and then across straight-away units 358 and 360. The straight-away unit 362 serves as a unloading station where the entire shipping container is picked up and moved onto the automated guided vehicle 370 by a overhead hoist 372, or by a fork truck or other container transferring device. The loaded container is then carried bodily into the assembly plant for unloading at the desired location. After unloading of the cargo from the container, the automated guided vehicles, such as 376, are then returned to the second branch 352 where the empty container is then transferred from the automated guided vehicle 376 onto straight-away unit 378, and then across straight-away units 380 and 382. The elevator unit 348 may then return the empty container to the trailer 340.

Accordingly, it will be appreciated that in the third embodiment, of the invention, FIG. 10, the plant floor apparatus is comprised of two separate branches; one for handling loaded containers and the other for handling empty containers. The loaded containers are physically removed from the plant floor apparatus and taken further into the assembly plant for unloading and then returned back to the unloading branch 352 for eventual return into the trailer by the elevator unit 348.

Thus, it is seen that the invention provides a new and improved method and apparatus for unloading and reloading returnable containers from a trailer.

What is claimed is:

1. Apparatus for the automated unloading of a load of stacked shipping containers from a loaded trailer, unstacking of the containers, removing of articles from the shipping containers, restacking of the empty containers, and returning of the empty shipping containers to an empty trailer, comprising:

a trailer dock for docking the loaded and empty trailers;

each of the trailers having a doorway, a load floor to support a row of the containers, and a motorized conveyor mounted on the load floor for advancing the row of containers rearwardly out of the doorway to unload the trailer and for advancing the row of containers forwardly away from the doorway and into the trailer to reload the trailer;

a carousel conveyor located behind the trailers and having a plurality of stations through which the containers are progressively conveyed, including at least an entry station adjacent the loaded trailer to receive a loaded container, an unstacking station at which the stacked containers are unstacked, an unloading station at which the container is unloaded, a stacking station at which the containers are restacked, and an exit station adjacent the empty trailer to eject the restacked empty container into the doorway of the empty trailer;

a first stacker unit provided at the unstacking station to lift the upper container off the lower container so that the lower container can be conveyed to the unloading station and then the upper container can be lowered and conveyed to the unloading station;

and a second stacker unit provided at the stacking station to lift the upper container high enough so that the lower container can be conveyed into the stacking station from the unloading station and then the upper container can be lowered onto the lower container and the stacked empty containers conveyed to the exit station for reloading into the empty trailer.

2. Apparatus for the automated unloading of a load of shipping containers from a loaded trailer, removing of articles from the shipping containers, and returning of the empty shipping containers to an empty trailer, comprising:

a trailer dock for docking a loaded trailer and an empty trailer;

each of the trailers having a doorway, a lower load floor to support a row of the containers, and a motorized conveyor mounted on the lower load floor for advancing the row of containers rearwardly out of the doorway to unload the trailer and for advancing the row of containers forwardly away from the doorway and into the trailer to reload the trailer;

a circuitous conveyor located behind the trailers and having a plurality of stations through which the containers are progressively conveyed in a circuitous path, including at least an entry station adjacent the loaded trailer to receive a loaded container, an unloading station at which the container is unloaded, and an exit station adjacent the empty trailer to eject the empty container into the doorway of the empty trailer;

wherein each of the trailers further includes an upper load floor to support a row of the containers, and an upper motorized conveyor mounted on the upper load floor for independently advancing each of the rows of containers rearwardly out of the doorway to unload the trailer and for advancing the row of containers forwardly away from the doorway and into the trailer to reload the trailer; and the circuitous conveyor further including an elevator having a lowered position for either receiving a loaded container being advanced rearwardly out of the lower load floor of the trailer or advancing a container forwardly into the doorway and into the trailer to reload the lower load floor of the trailer, said elevator being operable between the lowered position and a raised position to either receive a loaded container being advanced rearwardly out of the upper load floor and then lower the loaded container to the circuitous conveyor or lift an empty container from the circuitous conveyor to the upper load floor to reload the upper load floor.

3. The apparatus of claim 2 further characterized by the containers being double stacked on the upper load floor and the lower load floor and at least one stacker being provided in the circuitous conveyor to unstack and restack the containers.

* * * * *